US006189123B1

United States Patent
Anders Nyström et al.

(10) Patent No.: US 6,189,123 B1
(45) Date of Patent: Feb. 13, 2001

(54) METHOD AND APPARATUS FOR COMMUNICATING A BLOCK OF DIGITAL INFORMATION BETWEEN A SENDING AND A RECEIVING STATION

(75) Inventors: Per Johan Anders Nyström, Stockholm; Carl Johan Henrik Larsson, Solna, both of (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/824,469

(22) Filed: Mar. 26, 1997

(51) Int. Cl.[7] .................................................. H03M 13/00
(52) U.S. Cl. ........................................... 714/751; 714/752
(58) Field of Search ............................ 370/428; 714/786, 714/795, 780, 701, 755, 751, 752, 748; 378/65; 704/222; 348/422, 402; 367/137

(56) References Cited

U.S. PATENT DOCUMENTS

| | | | |
|---|---|---|---|
| 4,720,829 | * | 1/1988 | Fukasawa ............................ 714/701 |
| 4,727,546 | * | 2/1988 | Van Gils ............................. 367/137 |
| 5,068,724 | * | 11/1991 | Krause et al. ....................... 348/402 |
| 5,172,228 | * | 12/1992 | Israelsen ............................. 348/422 |
| 5,649,051 | * | 7/1997 | Rothweiler et al. ................. 704/222 |
| 5,734,962 | * | 3/1998 | Hladik et al. ......................... 378/65 |
| 5,809,043 | * | 9/1998 | Hassan et al. ...................... 714/780 |
| 5,815,515 | * | 9/1998 | Dabiri ................................. 714/795 |
| 5,835,508 | * | 11/1998 | Kushita ............................... 714/748 |
| 5,844,922 | * | 12/1998 | Wolf et al. ........................... 714/786 |
| 5,946,320 | * | 8/1999 | Decker ................................ 370/428 |
| 5,996,104 | * | 11/1999 | Herzberg ............................. 714/755 |

OTHER PUBLICATIONS

IEEE Transactions on Communications, 42(1994) Feb./Mar./Apr., No. 2/3/4, New York, NY USA, "Codes for Second and Third Order GH–ARQ Schemes", Luca de Alfaro et al., XP 000447343.

Professor Stephen B. Wicker, Coding and Information Theory Laboratory, Georgia Tech—Lorraine, Metz, France, 1991, Type–II Hybrid–ARQ Protocols Using Punctured Reed–Solomon Codes, XP 000273890.

IEEE Transactions on Communications, vol. Com–35, No. 10, New York, NY, USA, Oct. 1987, "A New Error Control Scheme for Hybrid ARQ Systems", Hari Krishna et al.

IEEE Transactions on Communications, 43(1995) Jun., No. 6, New York, NY USA, Complementary Punctured Convolutional (CPC) Codes and Their Applications, Samir Kallel.

Chan et al., "An Adaptive Hybrid FEC/ARQ Protocol Using Turbo Codes", Aug. 1997 IEEE, pp. 541–545.*

* cited by examiner

Primary Examiner—Albert De Cady
Assistant Examiner—David Ton
(74) Attorney, Agent, or Firm—Jenkens & Gilchrist

(57) ABSTRACT

Apparatus, and an associated method, facilitates the efficient utilization of a channel extending between a sending and a receiving station of a digital communication system. A block of symbols to be transmitted by the sending to the receiving station is encoded utilizing a parallel-concatenated encoding technique. Selected encoded versions, or portions thereof, are transmitted by the sending station to the receiving station. The receiving station decodes the signals received thereat. If recovery of the informational content of the block of symbols cannot be effectuated, a request is made to transmit additional encoded versions, or portions thereof, of the block of symbols.

41 Claims, 6 Drawing Sheets

METHOD AND APPARATUS FOR COMMUNICATING A BLOCK OF DIGITAL INFORMATION BETWEEN A SENDING AND A RECEIVING STATION

The present invention relates generally to the communication of a block of digital information in encoded form between a sending station and a receiving station in a digital communication system. More particularly, the present invention relates to apparatus, and an associated method, by which to communicate a transmission set formed of at least portions of at least one selected parallel-concatenated coded version of the block of digital information between the sending and receiving station.

If the receiving station is unable to accurately recover the informational content of the digital information from the transmission set transmitted thereto, successive, redundant transmission of additional transmission sets, formed of additional portions of selected encoded versions to the receiving station is initiated.

When channel conditions of a channel extending between the sending and receiving stations are of good quality, information throughput between the sending and receiving stations can be increased by sending only a small number of the transmission sets to the receiving station. And, when the channel conditions are poor, successive redundant transmission to the receiving station of the additional transmission sets better ensures that the informational content of the digital information can be accurately recreated. Feedback signals returned from the receiving to the sending station prompt the sending station to implement the successive, redundant transmission of the additional transmission sets to the receiving station.

BACKGROUND OF THE INVENTION

A communication system is formed, at a minimum, by a transmitter and a receiver interconnected by a communication channel. The transmitter forms at least a portion of a sending station, and the receiver forms at least a portion of a receiving station. Communication signals transmitted by the sending station are transmitted upon the communication channel to be received by the receiving station. Information contained in the communication signals transmitted by the sending station is recovered once received at the receiving station. In a digital communication system, information to be communicated to the receiving station is digitized. The digitized information is then used to form the communication signal.

In some conventional, digital communication systems, the communication signals are transmitted in bursts. Blocks of digital information are communicated by a sending station to a receiving station during transmission of the bursts upon the communication channel.

In a non-ideal communication system, the communication signal is distorted during its transmission upon the communication channel. Because of such distortion, when the communication signal is received at the receiving station, the received signal differs somewhat from the communication signal transmitted from the sending station. If the communication channel is of poor quality, and the amount of distortion is significant, the informational content of the communication signal cannot be properly recovered at the receiving station.

In a digital, radio communication system, for instance, multi-path and Rayleigh distortion is sometimes introduced upon the communication signal as it is transmitted on the communication channel from the sending station to the receiving station.

Various schemes have been developed to better ensure that the informational content of the communication signal transmitted upon a non-ideal channel can be recovered at a receiving station. Several of such schemes utilize a feedback arrangement in which the receiving station reports back to the sending station whether the informational content of the received signal can be adequately recovered.

Several of such schemes have been implemented in a digital communication system in which blocks of information are communicated in bursts. The receiving station determines whether a burst of the block of information received at the receiving station is of an acceptable quality level. Indications of the determinations, forming feedback information, are returned to the sending station by way of a feedback channel. The indication may also be communicated back to the sending station implicitly. That is to say, lack of transmission of feedback information from the receiving to the sending station may be indicative of successful recovery of the informational content of the block of digital information. Or, the feedback information may be provided to the sending station in a manner other than by way of a direct feedback channel extending directly to the sending station. The indication may alternately be communicated back to the sending station indirectly. For example, the sending station might measure the channel conditions and decide that the probability of the receiving station successfully decoding the block of digital information to be so low that retransmission of the block of digital information would be justifiable.

Most simply, the receiving station simply detects whether the received signal burst is of an acceptable quality level. If the signal quality level of the received signal burst is not good enough to permit recovery of the informational content thereof, the receiving station merely requests the sending station to retransmit the block of digital information in a subsequent burst. Such a scheme is sometimes referred to as an ARQ (automatic request) scheme.

Retransmission of the block of digital information can be repeated in successive bursts until the block of digital information is received at the receiving station with at least a minimum quality level. The receiving station makes the determination of the quality of the received block of digital information responsive, for example, to detection of an error detecting code, knowledge of the communication channel upon which the block of information is transmitted, or some other suitable scheme.

The block of digital information can also be transmitted using an error protecting code, such as type I hybrid ARQ (Automatic Repeat Request) scheme, a general channel decoding technique. When the receiving station receives the block of digital information, the received block is decoded by a decoder to extract the informational content from the received signal. A determination is made if the informational content of the block of digital information can be recovered with at least an acceptable quality level. Because of the error protection, the block of digital information is better able to be recovered even if transmitted upon a communication channel of lowered quality.

Furthermore, if the decoder has the ability to exploit, not only the values of the received symbols, but also reliability information on the symbols, so-called soft information, the performance will increase substantially. Decoder circuitry at the receiving station capable of utilizing soft information is referred to as a soft input decoder.

In some other schemes, such as a type II and type III, hybrid ARQ (Automatic Repeat Request) scheme, blocks of digital information determined by the receiving station to be corrupt, i.e., to be of poor quality, are not merely discarded. Instead, the corrupt blocks are combined with subsequently-transmitted blocks of digital information. Information contained in previously-transmitted blocks is accumulated and forms accumulated knowledge. Such accumulated knowledge can be used to facilitate recovery of subsequently-transmitted blocks. Thereby, "accumulated knowledge" results, the number of times in which the blocks of digital information must otherwise be retransmitted decreases. The advantages of utilization of accumulated knowledge permitted by the combining of successive retransmissions of the blocks of digital information occur with increased amounts of information contained in the blocks of digital information.

This is advantageous as the probability of correct decoding generally increases if the accumulated knowledge is used during the decoding rather than if only the latest retransmitted block is utilized. Decoder circuitry at the receiving station capable of utilizing soft information is referred to as a soft input decoder.

In another scheme, a sequence formed of other symbols created from the same block of digital information is instead transmitted. For instance, if the first sequence is formed of an original set of parity symbols (possibly including uncoded information symbols of the block of digital information) and retransmission is requested, additional numbers of parity symbols are transmitted by the sending station in the retransmitted sequence. The receiving station accumulates the received symbols of the various transmissions and the symbols accumulated during the various transmissions are utilized together during a decoding process.

A conventional block or convolutional low rate coding process can be performed to form an encoded signal. Then, the encoded signal is "punctured." That is, selected symbols of the coded block are marked so as not to be transmitted. Only the "unpunctured" symbols, i.e., symbols which have not been marked, are transmitted. While the coded signal is weakened by transmitting only some of the encoded symbols, a higher effective coding rate is possible for a given encoder structure. If the informational content of the block of digital information can not be recovered with a desired level of quality from the symbols first received at the receiving station, additional coded portions of the signal are requested by the receiving station to be transmitted thereto. Some of the previously-punctured, and not-yet sent, symbols are thereafter transmitted by the sending to the receiving station. The receiving station utilizes both the previously-transmitted symbols and the newly-transmitted symbols. If additional retransmissions are required, yet additional symbols are subsequently transmitted to the receiving station. Such a scheme is referred to as a successive redundancy transmission scheme.

A successive redundancy transmission scheme, designed to be able to cope with adverse channel conditions, however, requires a complex decoding process to be performed to recover the informational content of the block of digital information. And, if the block of digital information is coded using a convolutional coding scheme, the decoding required at a receiving station to decode the information is complex irrespective of the amount of puncturing of the code.

When using a punctured convolutional code, a set of received redundant symbols that would, by themselves, cause a decoding error to occur still cooperate in the same way to counteract any error correcting attempts supported by additional redundant bits.

When the channel conditions of the communication channel extending between the sending and receiving stations are of poor quality, conventional codes of moderate complexity do not perform well. High-complexity codes, which perform well at such conditions, however, add unnecessary complexity when the channel conditions are of good quality. That is to say, while complex coding is necessitated when the channel conditions are of poor quality levels, such channel coding is not necessary when the channel conditions are of good quality levels.

A manner by which to adaptively select the complexity of the coding of a block of digital information to be transmitted between a sending and a receiving station would therefore be advantageous. When channel conditions are of good quality, only limited portions of a coded signal would have to be transmitted to a receiving station to permit recovery of the informational content thereof. And, when channel conditions are of poor quality, additional portions of the coded signal could be transmitted, better to ensure that the informational content of the block of digital information can be recovered at the receiving station.

It is in light of this background information related to digital communication systems that the improvements of the present invention have evolved.

SUMMARY OF THE INVENTION

The present invention, accordingly, advantageously provides apparatus, and an associated method, by which to communicate a transmission set formed of at least portions of at least one selected parallel-concatenated coded version of a block of digital information between a sending station and a receiving station.

When received at the receiving station, a determination is made as to whether the informational content of the block of digital information from which the transmission set is formed can be adequately recovered. Distortion introduced upon the transmission set transmitted to the receiving station might prevent the receiving station from adequately recovering the informational content of the block of digital information. If so, the receiving station requests the sending station to transmit another transmission set formed of at least portions of at least one of the selected parallel-concatenated coded versions of the block of digital information to the receiving station. Successive, redundant transmission of additional transmission sets to the receiving station is effectuated if the informational content of the block of digital information is still not possible to recover adequately.

The number of the transmission sets which are transmitted by the sending station is dependent upon the quality of the channel conditions extending between the sending and receiving stations. When channel conditions are of good quality, fewer transmission sets are required to be transmitted to permit the receiving station to recover the informational content of the block of digital information. And, when the channel conditions are of poor quality, increased numbers of transmission sets are transmitted to ensure better that the receiving station is able to recover the informational content of the block of digital information. Thereby, when channel conditions are of good quality, information throughput rates are improved, and, when the channel conditions are of poor quality, transmission of additional transmission sets formed of portions of coded versions of the block of digital information better facilitate recovery of the block of digital information. Thereby, the complexity of encoding and decoding at the sending and receiving stations, respectively, is adaptably controlled.

In one aspect of the present invention, the sending station includes a parallel-concatenated coder for forming a plurality of encoded versions of a block of digital information. A transmitter is selectively coupled to be provided with transmission sets formed of at least selected portions of at least selected ones of the encoded versions of the block of digital information. The transmitters are operable to transmit the transmission sets to a receiving station. A selector controls formation of the transmission sets and when the transmission sets are provided to the transmitter. The selection by the selector is made responsive to indications as to whether the receiving station is able to recover adequately the block of digital information from the digital information from the one or more transmission sets, previously-transmitted to the receiving station. When channel conditions are of poor quality, the selector selects additional transmission sets to be transmitted by the transmitter to the receiving station.

In another aspect of the present invention, the receiving station includes a parallel-concatenated decoder coupled to receive at least indications of the transmission sets of the portions of the encoded versions of the block of digital information transmitted to the receiving station by the sending station. The parallel-concatenated decoder decodes the encoded signal received at the receiving station and forms a decoded signal responsive thereto. A determiner determines whether the decoded signal formed by the parallel-concatenated decoder permits recovery of the block of the digital information with at least a selected level of accuracy. A requestor is operable at least responsive to determinations by the determiner that the decoded signal formed by the parallel-concatenated decoder fails to permit the recovery of the block of digital information with at least the selected level of accuracy. The requester requests the sending station to transmit another transmission set formed of a selected portion of another selected encoded version of the block of digital information.

In one implementation, the present invention is embodied in a cellular communication system which utilizes digital communications, such as a GSM (Global System For Mobile Communications) communication system. When installed at the base station and mobile terminals operable in the cellular communication system, operation of an embodiment of the present invention facilitates communication, both of downlink and uplink transmissions, between the base station and mobile terminals. When channel conditions are of good quality, the amount of coded data communicated between the base station and mobile terminal is minimized, thereby to maximize throughput rates. And when channel conditions are of poor quality, increased amounts of coded data is communicated between the base station and the mobile terminal, thereby to facilitate recovery of the informational content of the transmissions.

In these and other aspects, therefore, a method and an associated apparatus, selectively iteratively increases redundancy of a block of digital information communicated by a sending station to at least one receiving station in a digital communication system. A block of digital information is parallel-concatenated coded to form a plurality of encoded versions of the block of digital information. At least a first selected portion of at least one selected encoded version of the plurality of encoded versions of the block of the digital information is transmitted from the sending station to the at least one receiving station. Iterative transmission of at least a second selected portion of at least one selected encoded version of the plurality of encoded versions of the block of the digital information from the sending station to the receiving station is initiated if recovery of the block of digital information at the receiving station is not possible with at least a selected level of accuracy. The second selected portion has at least one part which is dissimilar with the first selected portion of the at least one selected encoded version.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
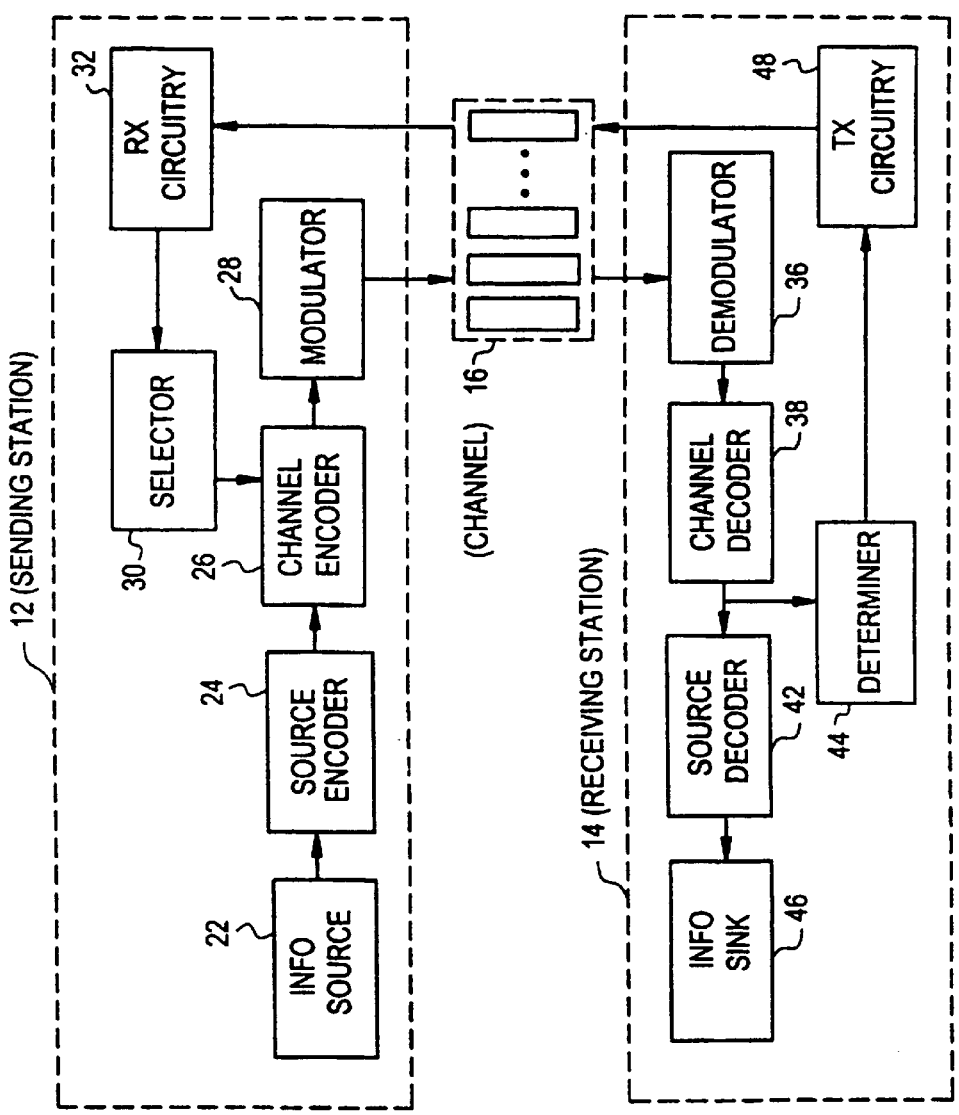
FIG. 1 illustrates a functional block diagram of a communication system in which an embodiment of the present invention is operable.

FIG. 1 illustrates a communication system, shown generally at 10, in which an embodiment of the present invention is operable. While the following description shall be described with respect to an exemplary embodiment in which the communication system 10 forms a cellular communication system, it should be understood that such description is by way of example only. The communication system 10 is similarly representative of other types of communication systems, both non-wireline and wireline in nature. Embodiments of the present invention are similarly operable in such other types of communication systems. And, operation of the various embodiments of the present invention can similarly be described with respect to such other types of communication systems.

The communication systems 10 includes a sending station 12 and a receiving station 14 coupled by way of a communication channel 16. Exemplary operation of the communication system 10 shall be described with respect to transmission of a downlink transmission transmitted by the sending station 12 forming a radio base station to the receiving station 14 forming a mobile terminal. Operation can analogously be described with respect to transmission of an uplink signal by a sending station forming a mobile terminal to a receiving station forming a radio base station. In the exemplary embodiment, the communication system forms a digital communication system in which blocks of digital information are transmitted in bursts between the sending station 12 and the receiving station 14.

The sending station 12 receives, or generates, an information signal, here shown to be formed by an information source 22. An information signal formed by the information source 22 is encoded by a source encoder 24. The source encoder, in one embodiment, digitizes and formats the information signal applied thereto.

A formatted, source-encoded signal generated by the encoder 24 is applied to a channel encoder 26. The channel encoder 26 channel-encodes the signal applied thereto in manners which shall be described in greater detail below with respect to FIGS. 3 and 4.

In the exemplary embodiment, the channel encoder forms a parallel-concatenated encoder which forms a plurality of encoded versions of blocks of digital information provided thereto by the source encoder 24. Selected portions of selected encoded versions formed by the channel encoder 26 form transmission sets which are selectively applied to a modulator 28. Selection of which portions of which encoded versions formed by the channel encoder 26 form the transmission sets and are provided to the modulator 28 is made by a selector 30. The selector 30 is formed of, for example, a processing device. The selector 30 is operable responsive to indications of feedback information reported back to the sending station 12 by the receiving station 14. Such feedback information is here received by receiver circuitry 32 of the sending station 12.

The modulator 28 modulates the transmission sets provided thereto by the channel encoder to permit transmission of the transmission set upon the communication channel 16. The channel 16 is here shown to include multiple numbers of paths forming a multi-path communication channel. Distortion is introduced upon the signal transmitted upon the multi-path channel by the sending station 12. Such distortion causes the signal received by the receiving station 14 to differ from that which is transmitted by the sending station 12.

The receiving station 14 includes a demodulator 36 for demodulating the downlink signal received at the receiving station 14. The demodulator 26 generates demodulated signals which are applied to a channel decoder 38 which decodes the demodulated signal applied thereto in a manner generally reverse to that used by the channel encoder 26 of the sending station 12. Additional details of operation of the decoder 38 shall be described with respect to the description of FIGS. 5 and 6 below.

The channel decoder generates a channel-decoded signal which is provided to a source decoder 42 and to a determiner 44. The source decoder 42 is operable to source decode a signal applied thereto and to provide a decoded signal to an information sink 46.

The determiner 44 is operable to determine whether the channel decoder 38 has been able to decode the signal applied to the channel decoder 38 with at least a selected level of accuracy. If a determination is made by the determiner 44 that the channel decoder has been unable to adequately decode the signal applied thereto, a request is generated by transmitter circuitry 48 of the receiving station 14 for transmission back to the sending station. The request requests the sending station to transmit another transmission set. Such an indication is received by the receiver circuitry 32 of the sending station 12. The selector 30 of the sending station 12 is provided with indications of the request and causes the channel encoder 26 to provide another transmission set to the modulator 28.

Successively-redundant, iterative transmission of additional transmission sets can be performed by the sending station 12 to the receiving station 14, if necessary, to ensure better that the receiving station 14 is able to recover the informational content of the block of digital information.

When an additional transmission set is to be selected by the selector 30 of the sending station 12 to be transmitted to the receiving station 14, the newly-selected transmission set, selected by the selector, differs from at least one, but not necessarily all, of previously-transmitted transmission sets associated with the corresponding information block. In an exemplary embodiment, the same transmission set can be retransmitted but not until at least another, dissimilar transmission set has before been transmitted. Two transmission sets are said to differ when they are formed by taking a different set of code bits from possibly different, encoded versions of the parallel-concatenated code. Viz., the actually-transmitted symbol values transmitted with two different transmission sets may happen to be equal, but the positions and, possibly, the constituent codes from which they are formed differ for at least one number of the sets.

By way of an example, a second transmission set must differ from the first transmission set. The third transmission set must differ from the first transmission set or the second transmission set, but not necessarily from both previously-transmitted, transmission sets. And, trivially, since the second set must differ from the first set, and the third set cannot equal both the first and second sets simultaneously, the third set complies with the constraint automatically. And, thus, no other constraints are needed for the third transmission set. Subsequently-transmitted transmission sets can similarly be analyzed. Therefore, the constraint on transmission set selection is merely that the secondly-transmitted transmission set must differ from the firstly-transmitted set. These sets are referred to as second and first transmission sets, respectively.

Figure 2:
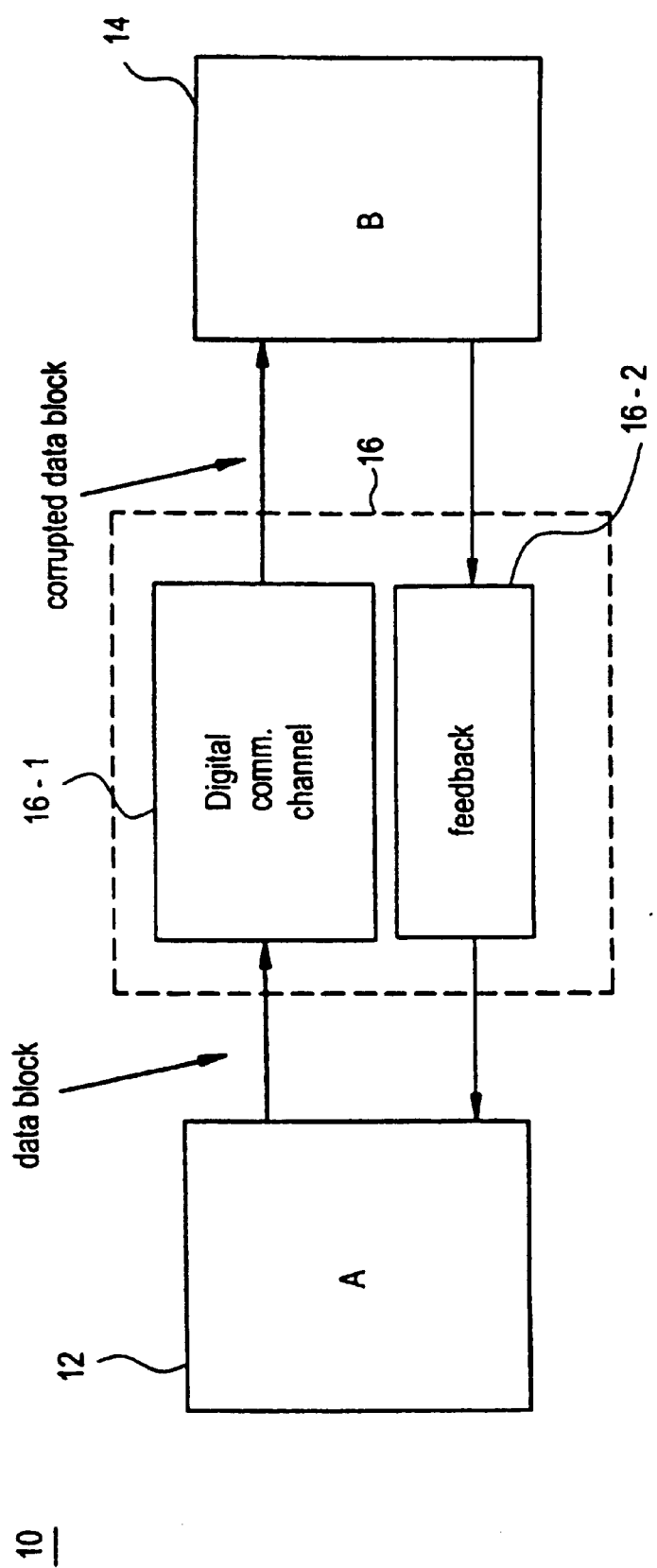
FIG. 2 illustrates another functional block diagram of the communication system shown in FIG. 1.

FIG. 2 again illustrates the communication system 10 and illustrates the feedback arrangement by which the receiving station 14 reports back to the sending station 12 requests to transmit an additional transmission set formed of an additional portion of selected encoded versions of a block of digital information. The sending station 12 is operable to transmit upon a forward channel portion 16-1 a transmission set formed of at least a selected portion of at least a selected encoded version of the block of digital information.

The receiving station 14 receives the transmission set formed of the at least the portion of the at least one encoded version of the block of digital information, once transmitted upon the forward channel portion 16-1. The receiving station 14 reports back by way of a reverse channel, here the feedback channel 16-2, when the informational content of the signal transmitted to the receiving station 14 cannot be recovered with the selected level of accuracy. Iterative transmission of additional portions of selected encoded versions of the block of digital information can be effectuated, if necessary, better to ensure that the receiving station 14 is able to recover the informational content of the data transmitted thereto.

When, conversely, the forward channel 16-1 is of a good quality level and the receiving station 14 is able to recover the informational content of the signal transmitted thereto, repeated, iterative transmissions of portions of encoded versions of the block of digital information need not be transmitted to the receiving station. Thereby, throughput rates of information transfer between the sending and receiving stations 12 and 14 are improved.

Figure 3:
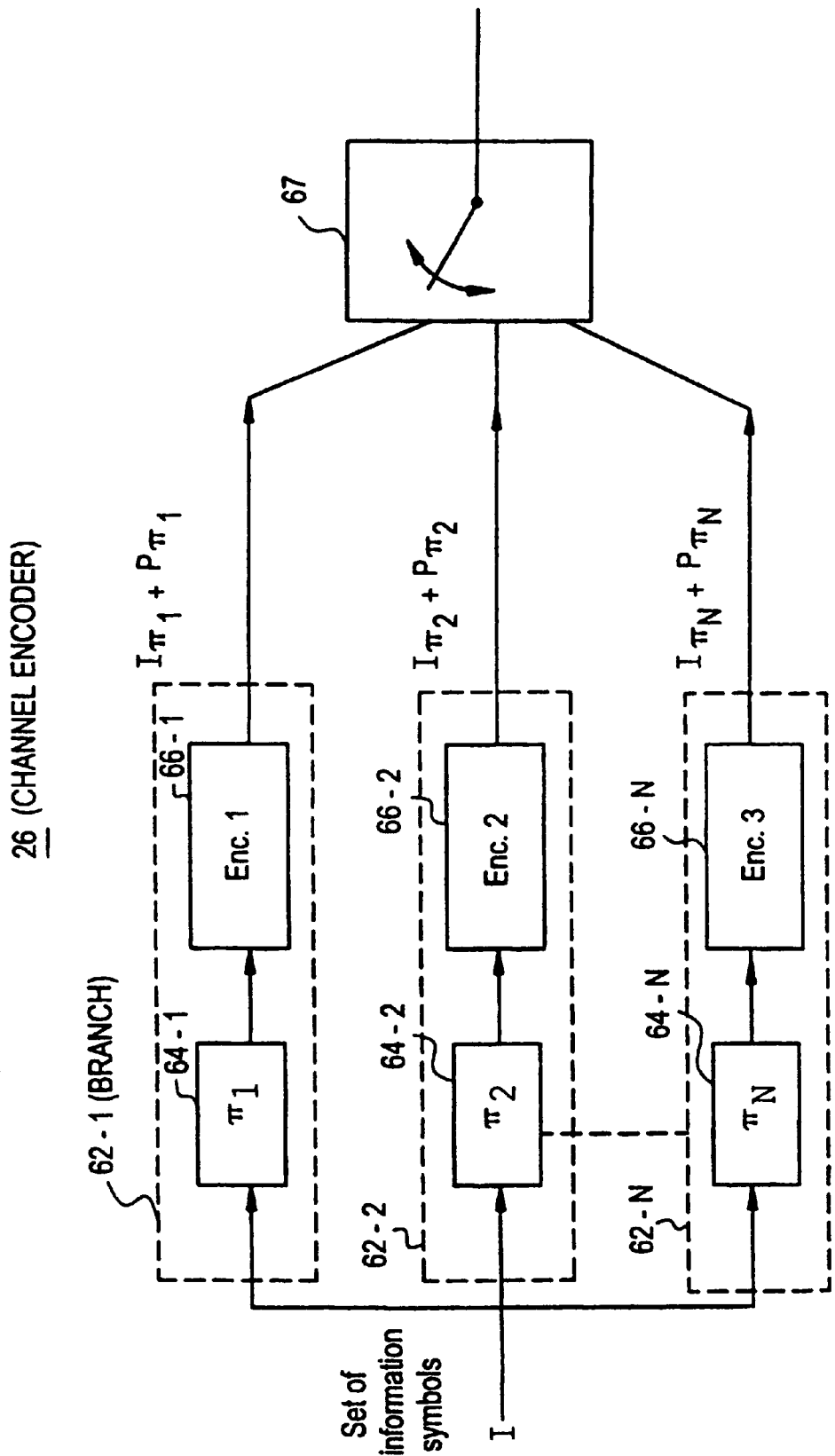
FIG. 3 illustrates a functional block diagram of a parallel-concatenated encoder forming a portion of a sending station of an embodiment of the present invention.

FIG. 3 illustrates the channel encoder 26 which forms a portion of the sending station 12, shown in FIG. 1. The channel encoder 26 forms a parallel-concatenated encoder for forming, in parallel, the plurality of encoded versions of a block of information symbols.

For purposes of explanation, the block of digital information is formed of a length of K information symbols I. Each K-length block of I-symbols is applied to N branches, here branches 62-1, 62-2, . . . , and 62-N, of the channel encoder 26. Each branch permutes the block of information symbols provided thereto by a separate permutation. Each branch 62-1 through 62-N includes a permuter 64-1, 64-2, . . . , 64-N to perform such permutations. Collectively, the permuters permute the block of information symbols to form N separate permutations of the block of symbols provided to the encoder 26. A permutation performed by one of the branches may, for example, form a trivial identity permutation.

The permuted blocks of symbols formed by the permuters 64-1 through 64-N are provided on each respective branch, to a separate encoder, here encoders 66-1, 66-2, . . . , and 66-N. The encoders encode the permuted blocks of symbols provided thereto. In the exemplary embodiment, each of the encoders adds parity symbols to the permuted block provided thereto. And in one embodiment, the encoders of each of the branches form constituent, systematic encoder elements. The parity bits added by the encoders of the different branches may substantially correspond with one another in one embodiment, or may differ with one another in other embodiments.

A functional switch element 67 selectively passes selected portions of the encoded versions formed at the different branches. The switch element is controlled by the selector 30 (shown in FIG. 1). If all of the information symbols and all of the parity symbols formed by the channel encoder 26 are provided to the modulator 28 (shown in FIG. 1) and transmitted, the following effective code rate, CR, for each block of symbols is as follows:

$$CR = \frac{K}{K + n_1 + \ldots + n_N}$$

wherein
  K is the length of the block of information symbols, I; and
  n is the number of parity symbols added by each of the N branches of the encoder 26.

Figure 4:
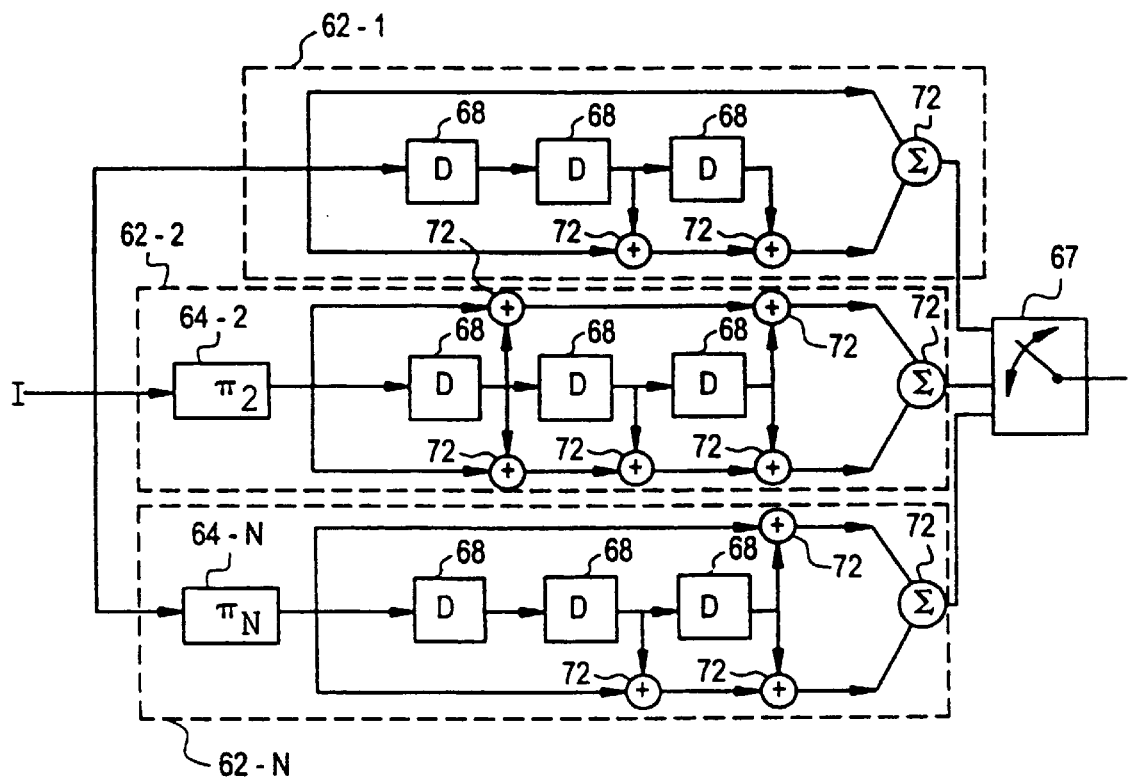
FIG. 4 illustrates another functional block diagram of the parallel-concatenated encoder shown in FIG. 3.

FIG. 4 illustrates again the channel encoder 26 shown in FIG. 3. In the illustration of FIG. 4, the branches 62-1, 62-2, . . . , and 62-N of an exemplary implementation of the channel encoder 26 are shown. At the branch 62-1, a separate permuter 64-1 (shown in FIG. 3) is not separately illustrated as a trivial identity permutation is provided to the encoder 66-1. Permuters 64-2 and 64-N are, however, separately illustrated in the branches 62-2 and 62-N, respectively.

Each of the encoders 66-1 through 66-N includes delay elements 68 and summation elements 72 for forming encoded signals in manners as described previously with respect to FIG. 3. And, the encoded signals formed by the encoder 66-1 through 66-N are selectively coupled, by way of the switch element 67, to the modulator 28 (shown in FIG. 1). The switch element 67 is again shown to be controlled by the selections made by the selector 30 (shown in FIG. 1).

During operation of an embodiment of the present invention, any selected portion of any selected one or more encoded versions of the block of symbols formed by any of the branches 62-1 through 62-N form a transmission set which is provided to the modulator. In one embodiment, an entire encoded version formed by a single branch forms the transmission set which is provided to the modulator. In other embodiments, selected portions of an encoded version form a transmission set which is provided to the modulator, and in other embodiments, the transmission set is formed of selected portions taken from different encoded versions generated by different ones of the branches of the encoder 26. Control over the selection is made by the selector 30 (again, shown in FIG. 1).

By way of an example, in an exemplary embodiment, a transmission set formed of a first encoded version generated by the first branch 62-1 is first transmitted to the receiving station 14. If the receiving station 14 is unable to recover the informational content of the block from the transmission set transmitted thereto upon the communication channel 16, a request is made for the sending station 12 to transmit additional information. The selector 30 causes a second transmission set formed of an encoded version of the block of symbols to be transmitted to the receiving station. Such a procedure can be repeated iteratively, if necessary, if the receiving station 14 is unable to recover the informational content of the block of symbols.

Thereby, when channel conditions are of good quality, throughput of information transmitted between the sending and receiving stations 12 and 14 can be maximized as only minimal portions of a parallel-concatenated coded signal must be transmitted to the receiving station. And, when channel conditions are of poor quality, additional encoded versions of the parallel-concatenated code formed by the channel encoder 26 are transmitted to the receiving station, better to ensure that the informational content of the block of symbols can be recovered thereat.

Figure 5:
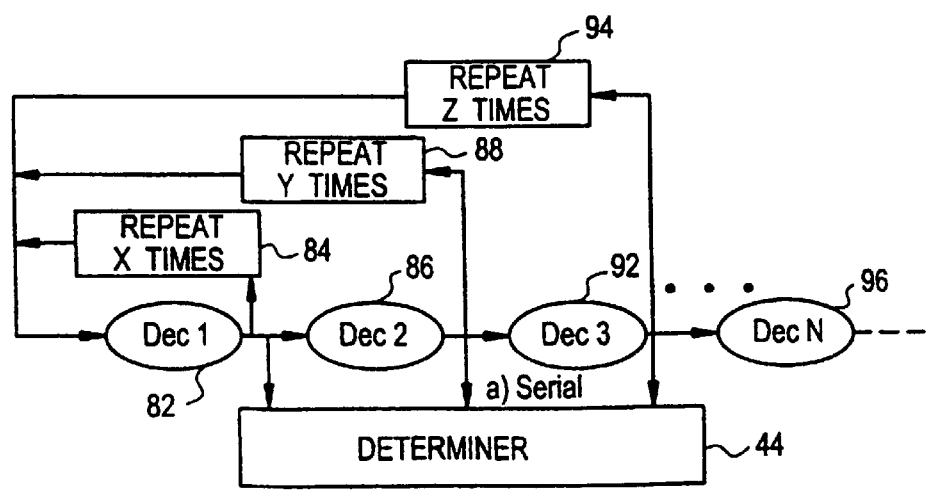
FIG. 5 illustrates a functional block diagram of operation of decoder circuitry of a receiving station of an embodiment of the present invention in which received sequences of a receive signal are iteratively decoded.

FIG. 5 illustrates exemplary decoder operation of the channel decoder 38 of the receiving station 14 when the at least portions of the selected encoded versions of the block of symbols are received at the receiving station. For purposes of illustration, operation of the channel decoder 38 shall be described with respect to the embodiment, described above, in which entire encoded versions formed by separate branches 62-1 through 62-N of the channel encoder are transmitted by the sending station 12 to the receiving station 14. In other embodiments, analogous operation of the channel decoder may instead be described.

When a first transmission set is received at the receiving station 14, demodulated by the demodulator 36, and applied to the channel decoder 38, decoding of the first encoded version is performed, as represented by the decoder one step 82. A determination is made, as indicated by the determiner 44 as to whether recovery of the informational content of the block of symbols can be made responsive to the first step of decoding 82. If recovery of the informational content of the block of symbols can be adequately performed, additional information pertaining to that block of symbols need not be transmitted by the sending station 12.

If, however, recovery of the informational content of the block of symbols cannot be successfully effectuated responsive to the first decoding step 82, a request is made for the sending station to transmit another transmission set. A transmission set formed of a second encoded version of the block of symbols is thereafter transmitted to the receiving station 14, and the transmission set is decoded by a second decoding step, here second decoding step 86. The first and second decoding steps 82 and 86 are repeated a Y number of times, as indicated by the block 88. Then, the determiner 44 again determines whether recovery of the informational content of the block of symbols can be effectuated with a selected level of accuracy. If so, transmission of additional information pertaining to that block of symbols need not be transmitted by the sending station.

If, however, recovery of the informational content of the block of symbols cannot be effectuated with the selected level of accuracy, a request is made for the sending station 12 to transmit another transmission set formed of another encoded version of the block of symbols. When such additional transmission set is received at the receiving station 14 and demodulated by the demodulator 36, the third encoded version is decoded, as indicated by the third decoding step 92.

The three decoding steps 82, 86 and 92 may be repeated a Z number of times, as indicated by the block 94. Thereafter, the determiner 44 again makes a determination as to whether the informational content of the block of symbols can be recovered adequately. If so, transmission of additional information is not necessitated. Otherwise, transmission of additional encoded versions, and successive decoding steps of which decoding step 96 is illustrative, are subsequently performed.

When channel conditions are of good quality and recovery of the informational content of the block of symbols can be effectuated by the decoding of only one or a few transmission sets, processing required to recover the informational content of the block is reduced. And, when channel conditions are of generally poor quality, additional transmission sets are transmitted by the sending station to the receiving station, better to ensure that the informational content of the block of symbols can be recovered.

Figure 6:
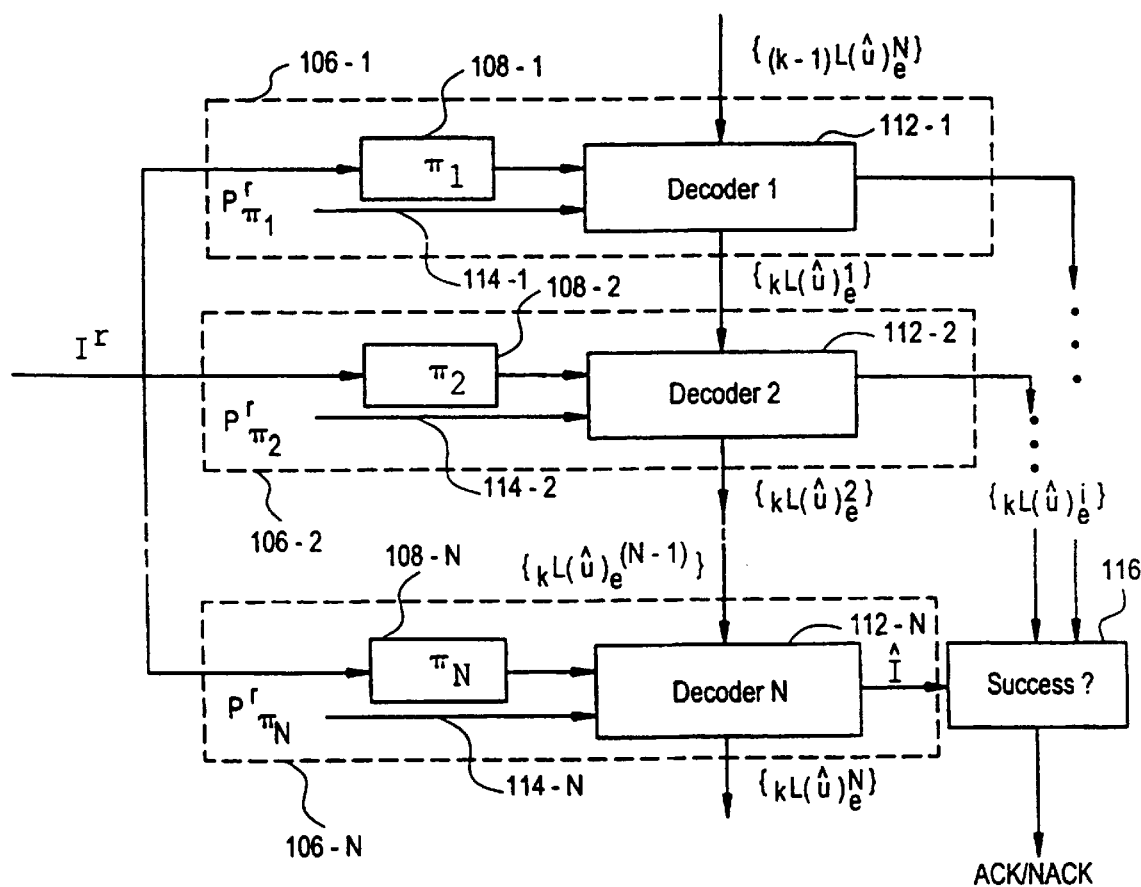
FIG. 6 illustrates a functional block diagram of a parallel-concatenated decoder forming a portion of a receiving station of an embodiment of the present invention.

FIG. 6 illustrates the channel decoder 38 of an embodiment of the present invention. A block of received symbols I$^r$ is provided to a first decoder branch 106-1. As illustrated, the channel decoder 38 includes a plurality of N decoder branches of which decoder branches 106-2 and 106-N are shown in the figure. Each of the decoder branches is coupled to receive the received block of systematic symbols. Again, operation of the channel decoder shall be described with respect to the embodiment in which entire encoded versions of the block of symbols are transmitted between the sending and receiving stations. In other embodiments, analogous operation of the channel decoder 38 can analogously be described.

The block of received systematic symbols is provided to the first decoder branch 106-1. The received block is applied to a first permuter 108-1. The permuter 108-1 performs a process generally identical to that of the permuter 64-1, shown in FIG. 3. Thereafter, the block of permuted received systematic symbols is provided to a first-branch decoder 112-1. The first-branch decoder 112-1 further receives indications of the parity bits forming at least part of the first encoded version of the block of symbols formed by the channel encoder 26, here indicated by way of line 114-1. And, the decoder 112-1 additionally receives a-priori information which, initially, might have associated therewith a zero confidence level.

The first-branch decoder is operable to decode the received block of symbols corresponding to the first encoded version of the block of symbols transmitted thereto. When the decoding operation has been completed, a determination is made, here indicated by the success query block 116, as to whether the decoding of the first encoded version has permitted recovery of the informational content of the block of symbols with at least a selected level of accuracy. If so, additional transmissions of additional encoded versions of the block of symbols need not be transmitted. If recovery of the informational content of the block of symbols cannot be successfully effectuated, a request is made, as indicated earlier, for the sending station 12 to transmit another encoded version of the block of symbols.

If transmission of the second encoded version of the block of symbols is necessitated, the symbols of the second encoded version are provided to the second decoder branch 106-2. The second decoder branch 106-2 also includes a permuter, here 108-2 and a second branch decoder 112-2. Such elements are operable in manner analogous to their counterparts of the first decoder branch 106-1. The second branch decoder 112-2 is also coupled to receive indications of the parity bits forming at least part of the coded version, here by way of line 114-2 and to receive a-priori information generated by the first branch decoder 112-1.

The decoders 112-1 and 112-2 alternately decodes the first and second received encoded versions of the block of symbols, respectively, a selected number of times. Once decoding operations have been completed at the second branch decoder 112-2, a determination is made, as indicated by the block 116 as to whether such decoding permits recovery of the informational content of the block of symbols. If the informational content can be recovered with at least a selected level of accuracy, additional transmissions by the sending station to the receiving station of that block of symbols is not necessitated.

Otherwise, another request is generated for transmission of another encoded version of the block of symbols. As illustrated, the channel decoder 38 includes N decoder branches permitting up to N number of encoded versions to be decoded. An Nth decoder branch 106-N is further illustrated in the figure. The Nth decoder branch also includes an Nth permuter 108-N and Nth decoder 112-N. The decoder 112-N is further coupled to receive indications of the parity bits forming at least part of the Nth encoded version provided by the channel encoder 26. And, the decoder 112-N is also coupled to receive a-priori information generated responsive to the preceding decoding steps. A determination is also made as to the success of the recovery of the informational content of the block of symbols transmitted by way of the determiner 116, such as by performing the decoding process a selected number of times.

In such manner, if channel conditions are of good quality and recovery of the informational content of the block of symbols can be recovered responsive to reception of one or a few encoded versions of the block of symbols, throughput rates of information transferred between the sending and receiving stations can be maximized. And, when channel conditions are of poor quality, the informational content of the block of symbols is more likely to be recovered responsive to the transmission of the additional encoded versions of the block of symbols.

The parallel-concatenated coder forming the channel encoder 26 can be considered to construct a number of transmission sets. Each transmission set consists of any selected number of information symbols and symbols from any number of parity sets $P_{ni}$. While not necessarily so, in one embodiment, the intersection between any two transmission sets forms an empty set. The dimension of a transmission set is defined to be the number of parity sets (or equivalently, the number of constituent codes) which have contributed to the particular transmission sets. In analogous fashion, the dimension of the union between any number of transmission sets is the number of parity sets (constituent codes) which have contributed to the union of the transmission sets.

A first transmission set is transmitted by the sending station 12 to the receiving station 14. Once the transmission set is received at the receiving station and provided to the decoder 38, decoding of the transmission set is performed. The first transmission set is decoded by the first decoding branch 106-1. The N number of decoder branches corresponds to the number of dimensions of the first transmission set. Again, as shown in FIG. 6, a-priori information $\{_0L(\hat{u})_e^{\ 1}\}$ can be used, if available, to facilitate decoding at the first branch decoder 106-1.

Iteration of the decoding of the first transmission set is performed a selected number of times, here over the iteration variable k, until some stopping criterion is met. Then, the success of the decoding is assessed, indicated in the Figure by block 116. An embedded error detecting code, for example, in the information set can be utilized to determine the success of the decoding. Or, estimation of the expected number of decoded bit errors using presently-available, inherent, soft information can be made to perform such an assessment. In another embodiment, the success of the decoding of the first transmission set is not assessed at that point. Instead, decoding of any outer error correcting codes is performed prior to making the assessment.

If the resulting set is determined to be reliable, no additional transmissions are necessitated and further operations on the receive set can be performed. Otherwise, the receiving station 14 reports feedback information back to the sending station 12 that the decoding of the first transmission set was unsuccessful.

If the decoding was unsuccessful, the sending station 12 then transmits another, the next, transmission set to the receiving station 12. The channel decoder 38 decodes such additional transmission set using any number of symbols from the union of the two available, received transmission sets wherein N is equal to the dimension of the total set of symbols used. The order of decoding the constituent codes, or even the basic decoder structure, may differ between any two decodings.

In one embodiment of the present invention, the sending station 12 initiates a second, or later, transmission without any explicit feedback information returned to the sending station by the receiving station. Instead, the sending station 12 bases a decision to initiate the additional transmission on an independent criterium, e.g., bandwidth availability of the channel 16 or a timer. If the bandwidth availability is the criterium, the sending station 12 automatically transmits a new transmission set corresponding to the block of information symbols if there is a channel 16 available and no other transmission set (of higher priority) awaits transmission. If timing out of a timer forms the criterium, the sending station 12 automatically transmits the new transmission set if no acknowledgment has been received, e.g., caused due to loss of feedback information, within a set time period after sending a previous transmission set corresponding to the block of information symbols.

The iterative transmission and decoding process continues until the block of information symbols has been satisfactorily received or discontinued due to the receiving station's inability to reach an acceptable result within, e.g., a set time period or a retransmission count limit.

In one implementation of an embodiment of the present invention, each transmission set consists only of information and parity bits taken from one particular constituent code, a different code for each transmission set. Thereby, the dimension for each of the transmission sets is a dimension of one. Also, at the receiving station 12, the received union of transmission sets has a dimension increasing by one for each transmission. Thus, the decoder complexity increases from transmission to transmission in the sense that exactly one more constituent decoder is needed each time in which a transmission set has been received, yielding a gradual decoder complexity increment.

In another implementation of an embodiment of the present invention, each transmission set consists of symbols from all, e.g., N, constituent codes. The dimension of the transmission set thereby equals N. Hence, the channel decoder 38 will always need N constituent decoding branches, yielding a higher, fixed, in the sense of number of constituent decoders, decoder complexity. However, possibly fewer transmissions and/or fewer iterations of decoding in the decoding structure might be necessitated as the resulting, higher dimension code presumably has better error correcting capabilities than a lower dimension code.

Figure 7:
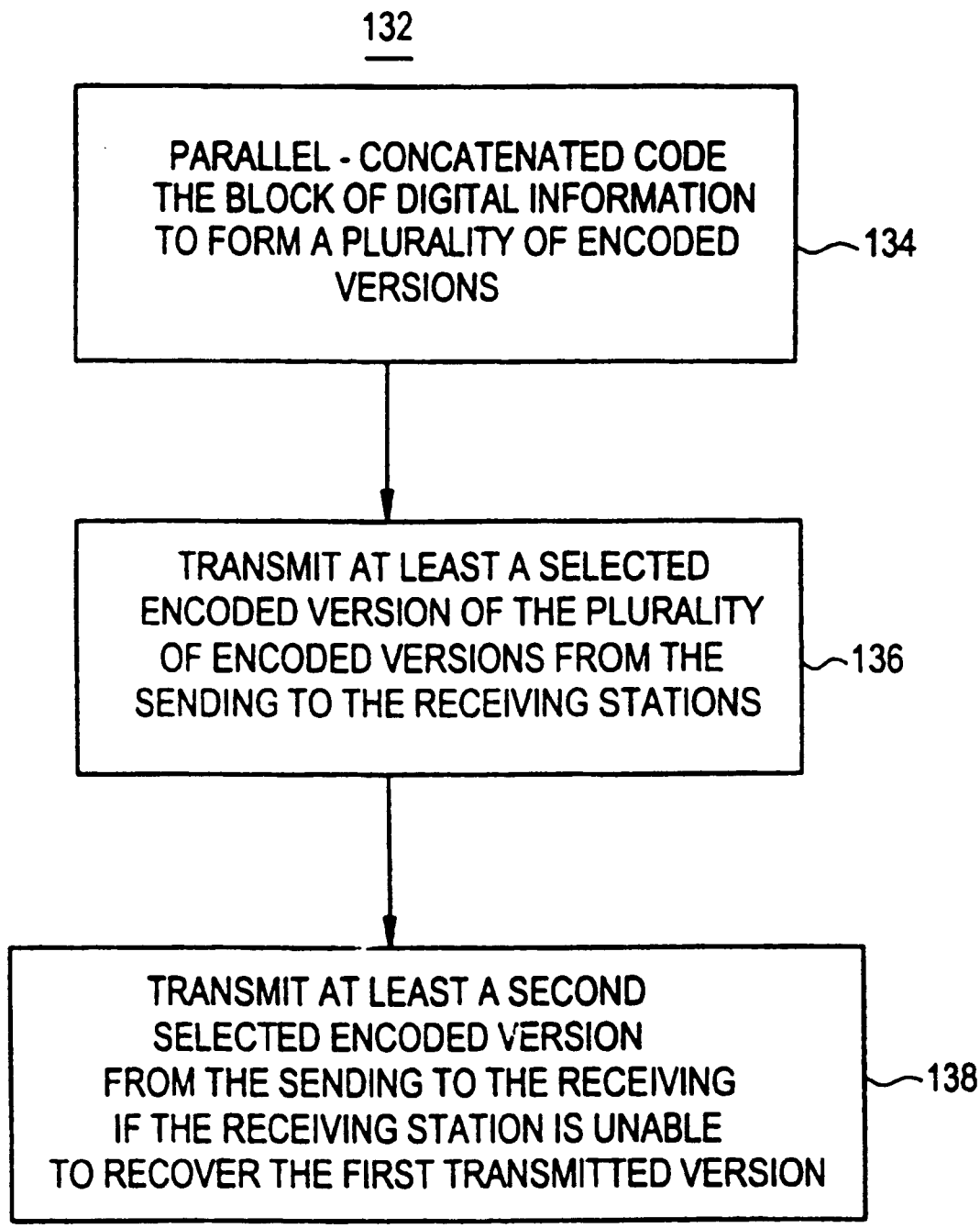
FIG. 7 illustrates a method flow diagram illustrating the method steps of an embodiment of the present invention.

FIG. 7 illustrates a method, shown generally at 132, of an embodiment of the present invention. The method selectively iteratively increases the redundancy of a block of digital information communicated by a sending station to at least one receiving station in a digital communication system.

First, and as indicated by the block 134, the block of digital information is parallel-concatenated encoded to form a plurality of encoded versions of the block of digital information. Then, and as indicated by the block 136, at least a selected portion of at least a first selected encoded version of the plurality of encoded versions of the block of digital information is transmitted from the sending station to the receiving station. And, as indicated by the block 138, transmission of at least a selected portion of at least one additional version of the plurality of encoded versions is initiated if recovery of the block of digital information at the receiving station is unrecoverable with at least a selected level of accuracy.

Through operation of an embodiment of the present invention, when channel conditions of a channel extending between the sending and receiving stations are of good quality, information throughput between the sending and receiving stations can be maximized. And, when the channel conditions are of poor quality, successive redundant transmission of the additional portions of the selected, encoded versions better ensures that the informational content of the digital information can be accurately recreated. Feedback signals returned from the receiving to the sending station prompt the sending station to implement the successive, redundant transmission of the additional portions of the selected encoded versions to the receiving station.

The previous descriptions are of preferred examples for implementing the invention, and to the scope of the invention should not necessarily be limited by this description. The scope of the present invention is defined by the following claims.

What is claimed is:

1. A method for selectively iteratively increasing redundancy of a block of digital information communicated by a sending station to at least one receiving station in a digital communication system, said method comprising the steps of:

parallel-concatenated coding the block of digital information to form a plurality of encoded versions of the block of the digital information;

selecting from among the plurality of encoded versions a first portion that is to be transmitted and a corresponding remaining portion that is not to be transmitted;

transmitting the first portion from the sending station to the receiving station without the remaining portion;

selecting from among the plurality of encoded versions a second portion to be transmitted; and initiating transmission of the second portion from the sending station to the receiving station if the block of digital information at the receiving station is unrecoverable with at least a selected level of accuracy, the second portion having at least one part which is dissimilar with the first portion transmitted during said step of transmitting.

2. The method of claim 1 wherein said step of initiating transmission comprises sending a request from the receiving station to the transmitting station to transmit the second portion.

3. The method of claim 1 wherein the first portion comprises a first selected encoded version in its entirety.

4. The method of claim 1 wherein the first portion comprises a selected portion of a first selected encoded version and a selected portion of at least a second selected encoded version of the plurality of encoded versions.

5. The method of claim 1 comprising an additional step, subsequent to said step of transmitting, of:
   determining whether recovery of the block of digital information at the receiving station with at least a selected level of accuracy is possible.

6. The method of claim 5 wherein said step of determining comprises iteratively decoding the first portion.

7. The method of claim 6 wherein said step of iteratively decoding comprises parallel-concatenated decoding of the first portion.

8. The method of claim 6 wherein said step of iteratively decoding comprises iteratively decoding the first portion a selected number of times.

9. The method of claim 8 wherein the selected number of times during which the first portion is iteratively decoded is selected to permit convergence of the decoding to within a selected range of permissible values.

10. The method of claim 1 wherein the plurality of encoded versions into which the block of digital information is coded during said step of parallel-concatenated coding comprises an N number of encoded versions.

11. The method of claim 10 wherein said step of parallel-concatenated coding to form the N number of encoded versions comprises permuting the block of digital information by an N number of permutations to form N permutations.

12. The method of claim 11 wherein said step of parallel-concatenated coding comprises block coding each of the N permutations of the block of digital information.

13. The method of claim 12 wherein each of the N permutations of the block of digital information coded during said step of parallel-concatenated coding are coded by a constituent, systematic coder.

14. The method of claim 1 wherein the second portion comprises all of at least one of the plurality of encoded versions of the block of the digital information.

15. The method of claim 1 wherein the second portion comprises a selected portion of a first of the plurality of encoded versions and a selected portion of at least a second of the plurality of encoded versions.

16. The method of claim 1 where the digital communication system comprises a digital multiple access communication system.

17. The method of claim 16 wherein the digital multiple access communication system uses time-division as part of a multiple access protocol.

18. The method of claim 16 wherein the digital multiple access communication system uses code-division as part of a multiple access protocol.

19. The method of claim 16 wherein the digital multiple access communication system uses frequency-division as part of a multiple access protocol.

20. The method of claim 1 wherein the digital communication system comprises a digital radio communication system.

21. The method of claim 20 wherein the digital radio communication system is a digital cellular radio communication system.

22. The method of claim 20 wherein the digital radio communication system constitutes the radio link of a radio in the local loop system.

23. The method of claim 20 wherein the digital radio communication system comprises a microwave radio link.

24. The method of claim 20 wherein the digital radio communication system comprises a digital satellite radio communication system.

25. The method of claim 1 wherein the digital communication system includes a digital control channel in an analog communication system.

26. The method of claim 1 wherein said step of parallel-concatenated coding comprises convolutionally coding the block of digital information.

27. The method of claim 26 wherein said step of convolutionally coding is carried out by parallel concatenated convolutional encoders, at least two of the parallel concatenated convolutional encoders utilizing generator polynomials of substantially identical values.

28. The method of claim 26 wherein said step of parallel-concatenated coding utilizes a "turbo" code.

29. The method of claim 1 wherein said step of parallel-concatenated coding comprises block coding the block of digital information.

30. The method of claim 1 wherein at least two of the encoded versions of the block of the digital information are formed using substantially identical codes.

31. A method for communicating a bit sequence between a sending station and a receiving station, said method comprising the steps of:
   encoding, at the sending station, the bit sequence according to a parallel-concatentated coding technique to form a plurality of parallel code portions;
   selecting from among the plurality of parallel code portions a first part that is to be transmitted and a corresponding remaining part that is not to be transmitted;
   transmitting the first part to the receiving station without the remaining part;
   parallel-concatentated decoding the first part subsequent to reception thereof at the receiving station;
   determining whether the bit sequence is recoverable with a selected level of accuracy from the first part subsequent to decoding thereof during said step of decoding;
   selecting, at least from said remaining part, a second part to be transmitted;
   transmitting the second part to the receiving station if the bit sequence is determined during said step of determining not to be recoverable with the selected level of accuracy; and if transmitted, thereafter parallel-concatentated decoding the second part subsequent to reception thereof at the receiving station.

32. The method of claim 31 wherein said step of parallel-concatentated decoding the first part comprises iteratively decoding the first part a selected number of times, each decoding iteration using a-posteriori information obtained during a preceding decoding iteration.

33. The method of claim 31 wherein the parallel-concatentated coding technique forms an N number of parallel code portions.

34. The method of claim 33 wherein said step of encoding the bit sequence to form the N number of parallel code portions comprises permuting the bit sequence by an N number of permutations to form N permutations.

35. The method of claim 34 wherein said step of encoding comprises block encoding each of the N permutations of the bit sequence.

36. The method of claim 35 wherein each of the N permutations of the bit sequence block encoded during said step of block encoding are dissimilar.

37. The method of claim 36 wherein each of the N permutations of the bit sequence block encoded during said step of block encoding are block-encoded by a constituent, systematic encoder.

38. In a digital communication system having a sending station for sending a block of digital information to at least one receiving station, a combination with the sending station of apparatus for selectively iteratively increasing redundancy of the block of digital information, said apparatus comprising:

a parallel-concatenated coder coupled to receive the block of digital information, said parallel-concatenated coder for coding the block of digital information to form a plurality of encoded versions of the block of digital information;

a transmitter selectively coupled to be provided with at least selected portions of at least selected ones of the plurality of encoded versions of the block of digital information coded by said parallel-concatenated coder, said transmitter for transmitting the at least the selected portions of the at least the selected ones of the plurality of encoded versions provided thereto;

a selector coupled to control which of the at least selected portions of the at least selected ones of the plurality of encoded versions are provided to said transmitter, said selector for selecting a portion of at least a first selected encoded version of the block of digital information to be provided to said transmitter and thereafter for selecting at least selected portions of at least one additional encoded version of the block of digital information if recovery of the block of information at the receiving station is indicated to be unrecoverable with at least a selected level of accuracy.

39. In a digital communication system having a receiving station for receiving digital information transmitted thereto by a sending station, the digital information in encoded form and formed of a first selected portion of at least one of a plurality of encoded versions of a block of digital information, the encoded versions produced by parallel-concatenated coding the block of digital information, a combination with the receiving station of apparatus for recreating the block of digital information, said apparatus comprising:

a parallel-concatenated decoder coupled to receive at least indications of the digital information transmitted to the receiving station in the encoded form, and for forming a decoded signal responsive thereto;

a determiner operable responsive to the decoded signal formed by said parallel-concatenated decoder, said determiner for determining whether the decoded signal formed by said parallel-concatenated decoder permits recreation of the block of the digital information with at least a selected level of accuracy; and a requester operable at least responsive to determinations by said determiner that the decoded signal formed by said parallel-concatenated decoder fails to permit the recreation of the block of the digital information with the at least the selected level of accuracy, said requester for requesting the sending station to transmit a second selected portion of at least another of the plurality of encoded versions of the block of digital information.

40. A method for communicating a sequence of symbols between a sending station and a receiving station, said method comprising the steps of:

parallel-concatenated coding the sequence at the sending station to form a plurality of parallel-code portions, each parallel-code portion having a selected number of code symbols;

forming a selected number of transmission sets, each transmission set having at least a selected number of code symbols selected from at least one of the parallel-code portions formed during said step of parallel-concatenated coding, at least one of the transmission sets of a value dissimilar to values of others of the transmission sets;

transmitting a first transmission set of the transmission sets formed during said step of forming to the receiving station; and selectively transmitting at least one additional transmission set of the transmission sets formed during said step of forming, the at least one additional transmission set including the at least one additional transmission set of a value dissimilar to the value of the first transmitted transmission set.

41. The method of claim 40 comprising the additional step of detecting, at the sending station, indications by the receiving station of acceptable recovery of the sequence of symbols responsive to reception at the receiving station of at least the first transmission set, and wherein the at least one additional transmission set is transmitted during said step of selectively transmitting absent detection for at least a selected period during said step of detecting of the indications of the acceptable recovery of the sequence of symbols.

* * * * *